Figure 1:
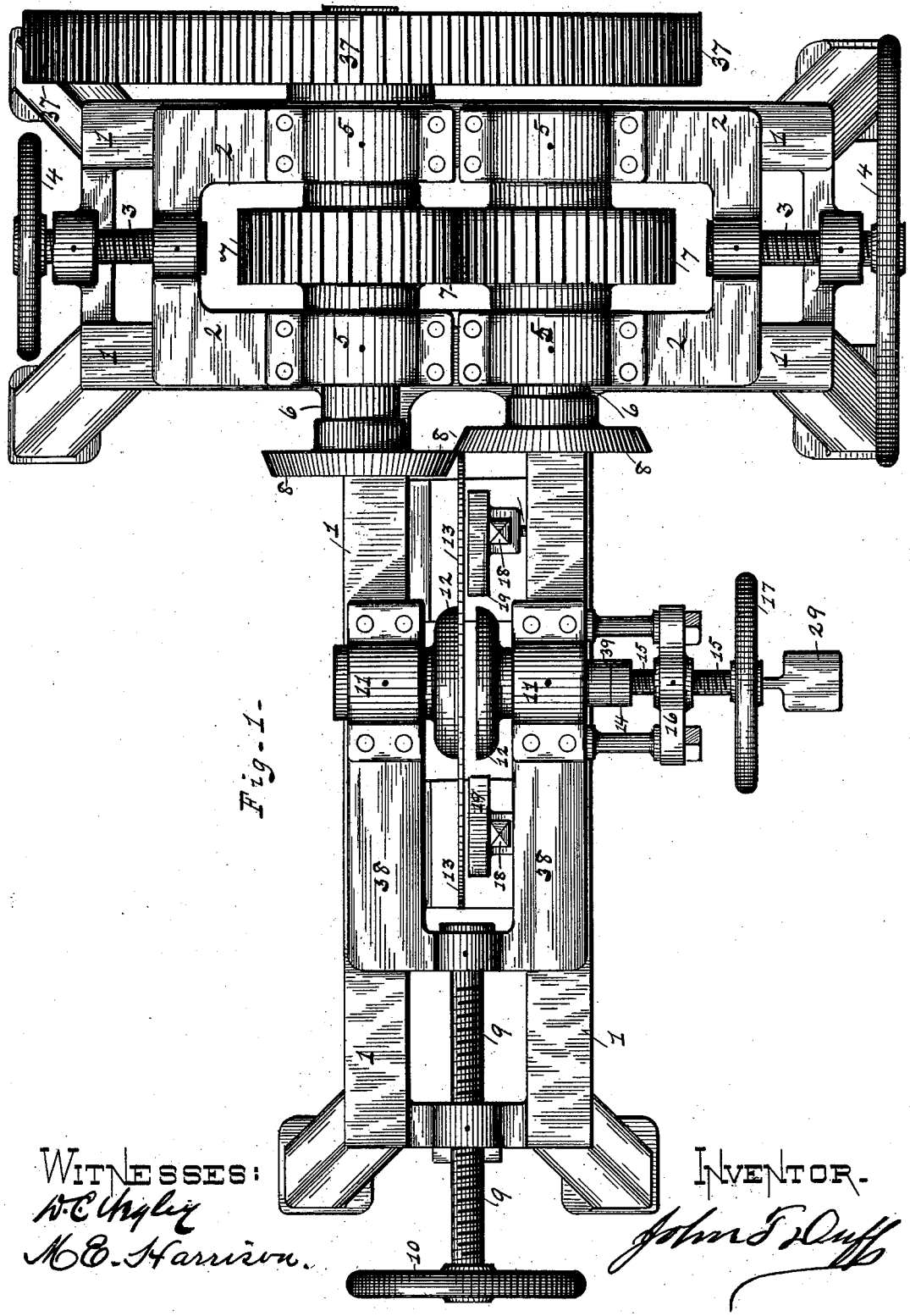

(No Model.)
3 Sheets—Sheet 1.

J. T. DUFF.
ROTARY SHEARS.

No. 358,439. Patented Mar. 1, 1887.

WITNESSES:
INVENTOR.

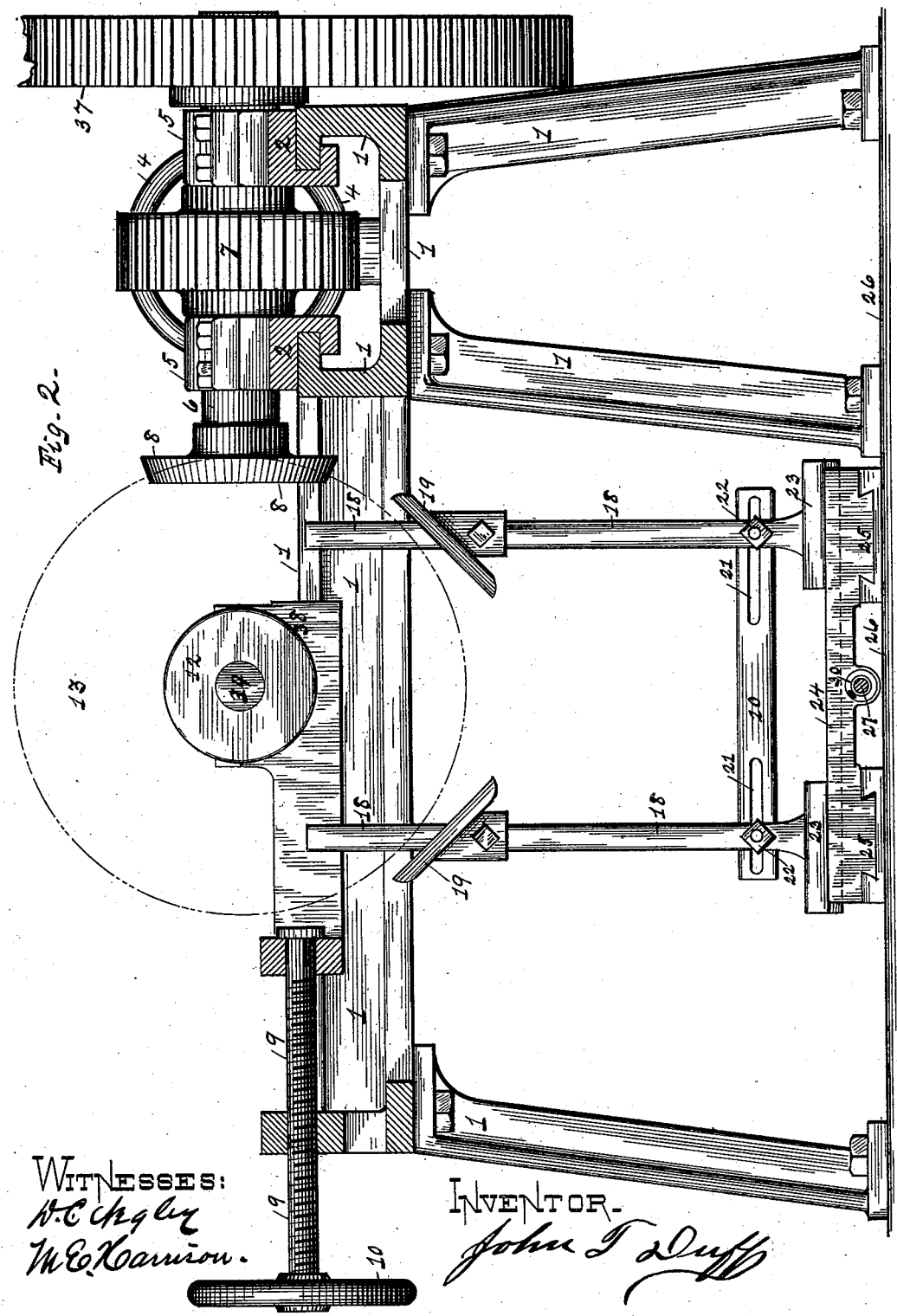

(No Model.)  J. T. DUFF.  3 Sheets—Sheet 3.
ROTARY SHEARS.
No. 358,439.  Patented Mar. 1, 1887.
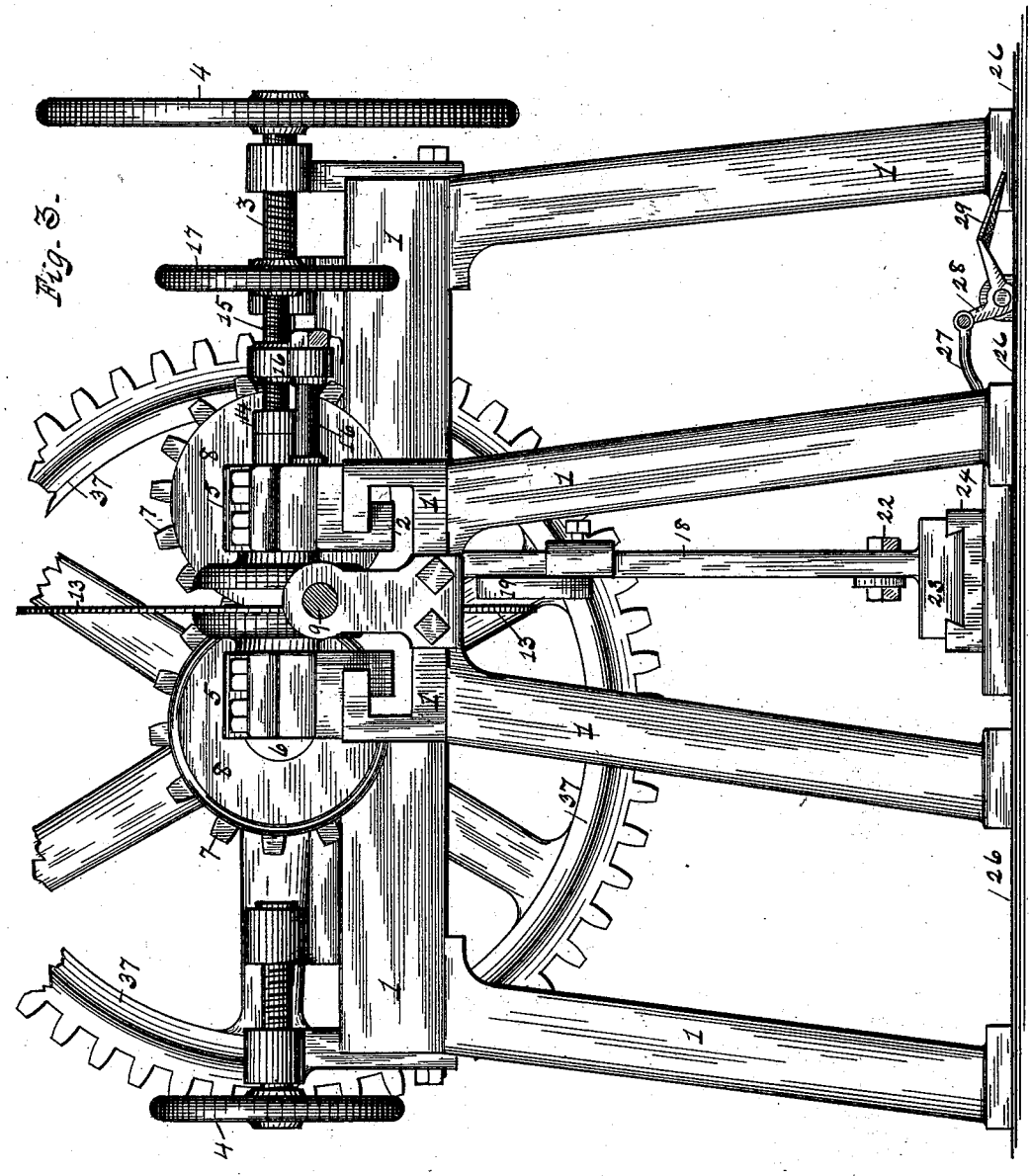
WITNESSES:
INVENTOR.

UNITED STATES PATENT OFFICE.

JOHN T. DUFF, OF PITTSBURG, PENNSYLVANIA, ASSIGNOR TO A. M. DUFF, A. M. NEGLEY, AND H. G. HUGUS, ALL OF SAME PLACE.

ROTARY SHEARS.

SPECIFICATION forming part of Letters Patent No. 358,439, dated March 1, 1887.

Application filed November 11, 1886. Serial No. 218,642. (No model.)

*To all whom it may concern:*

Be it known that I, JOHN T. DUFF, a citizen of the United States, residing at Pittsburg in the county of Allegheny and State of Pennsylvania, have invented certain new and useful Improvements in Rotary Shears; and I do hereby declare the following to be a full, clear, and exact description of the invention, such as will enable others skilled in the art to which it pertains to make and use the same, reference being had to the accompanying drawings, which form a part of this specification.

My invention relates to an improvement in rotary shears, the objects being to provide a means whereby metallic plates may be easily sheared in the form of a true circle, to provide a means whereby the plates will centralize themselves, and also to provide a device whereby plates of large or small diameter may be sheared by the same machine; and with these several ends in view my invention consists in a pair of rotary shears geared together and mounted on moving carriages or tables for the purpose of entering the plate between the shears, a gage for centralizing and sustaining the plate in position, and a means for securing and holding the same during the operation of shearing, together with the necessary details of construction and combination of parts, as will be fully set forth hereinafter.

In the accompanying drawings, Figure 1 is a plan view of my improved machine for shearing circular plates of metal, constructed according to my invention. Fig. 2 is a sectional elevation of the same, showing the inner working parts. Fig. 3 is an end elevation of my improved machine.

To put my invention into practice and give the same bodily form, I provide a frame, 1, of suitable size and form of construction. On one end of this frame 1, I mount two sliding carriages or tables, 2, capable of moving toward or from each other by means of threaded shafts 3, attached to the frame 1, and carriages 2, and suitable hand-wheels, 4, for operating the same. Across these carriages 2, I secure in proper bearings, 5, two parallel shafts, 6, each provided with a small toothed wheel, 7, the one meshing with the other. On the inner ends of each of these parallel shafts 6, I secure a rotary shear-blade, 8, consisting of a circular disk of hardened steel having a beveled perimeter and placed in such a position that the sides of the disks 8 having the largest diameters slightly overlap each other. To the reverse end of the rear shaft 6, I attach a large gear-wheel, 37, which gives the shear-blades 8 a slow and powerful rotation on their axes.

Secured to that portion of the frame 1 at right angles to the plane of the shears 8 is a large sliding carriage, 38, which may readily be removed from or toward the shear-blades 8 by means of a threaded shaft, 9, secured to the frame 1, and loosely attached to the carriage 38, and operated by a hand-wheel, 10. At one end of this carriage 38, I mount in suitable bearings, 11, two clamping-disks, 12, the one nearest the front capable of a limited movement in the direction of its length, for the purpose of inserting a metallic plate, 13, between the same. To the other end of the shaft 39, carrying the movable disk 11, I loosely attach, by means of a circular nut, 14, and collar, a threaded shaft, 15, arranged in a proper bearing, 16, projecting outwardly from the carriage 38. This shaft 39 is operated by a hand-wheel, 17, secured on the outer end of the same.

Directly below the carriage 38 I place a gage for the purpose of centralizing and sustaining the plate 13 in position until made fast between the clamping-disks 12. This gage I construct with two vertical posts, 18, having adjustably attached thereto guides 19, inclined toward each other at an angle of forty-five degrees. These posts 18, I attach together by a transverse bar, 20, having two slots, 21, formed therein extending in the direction of its length, in which are placed bolts 22, by which the posts 18 may be widely separated or closely connected to each other. At the base of each of these vertical posts 18 and integral therewith I form a sliding block, 23, which operates in dovetail slides provided in a small carriage, 24, capable of moving in an opposite direction to that of the vertical posts 18, by means of parallel dovetail slides 25, formed on the base-plate 26 of the machine. To this carriage 24, sustaining the gage, I attach a short rod, 27, leading from a bell-crank, 28, and foot-treadle 29, by which means the gage may be removed from beneath the plate 13, after the same has been secured between the clamping-disks 12. A short spiral spring, 30, wound about this rod 27, serves to bring the gage back to its original position the moment the foot-treadle 29 has been released by the operator.

The small pinions 7 on the sliding carriages 2, which operate the shear-blades 8, I construct with long slender teeth, which will admit of the same being separated a short distance without disengaging the same.

By moving the carriage 38, carrying the clamping-disks 12, toward or from the shear-blades 8, plates of any required diameter may be sheared.

In operation a square metallic plate, 13, is placed between the clamping-disks 12 in a diagonal position, which will centralize itself by means of the inclined guides 19, which has previously been set or adjusted to the proper position. The circular shear-blades 8, at the back of the plate 13, is adjusted to correspond to the thickness of the metal in the same by means of the threaded shaft 3, the small hand-wheel 4, and the rear carriage, 2. The large hand-wheel 4, at the front of the machine, is revolved until the shear-blades 8 have parted a sufficient distance to allow the plate 13 to enter between the same. The plate is now securely clamped between the two disks 12 by operating the hand-wheel 17. The operator, placing his foot on the treadle 29, removes the gage from beneath the plate 13, and by revolving the large hand-wheel 4 at the front the shear-blades 8 are brought together, which, having a slow rotary motion in opposite directions, revolve and shear the plate 13 in the form of a true circle. The gage is now allowed to return to its original position, the shear-blades 8 again separated, the clamping device released, the finished plate 13 removed, and the same operation continued on another.

Having thus described my invention, what I claim, and desire to secure by Letters Patent, is—

1. In a machine for shearing circular plates of metal, the circular shear-blades 8, mounted on shafts supported in bearings on adjustable moving carriages 2 and geared together by small toothed wheels 7, whereby the blades 8 may be caused to separate and allow the plates to be placed between.

2. In a machine such as described, consisting of the circular shear-blades 8, mounted on shafts supported in bearings on adjustable moving carriages 2, and a means for operating the same, the carriage or table 38, having a clamping device attached thereto and traveling at right angles to the carriages 2, before mentioned, and an adjustable gage for centralizing the plates, as and for the purpose set forth.

3. In a machine for the purpose described, consisting of a pair of rotary shears, 8, geared together, each mounted on shafts supported in bearings on a carriage, 2, adapted to travel toward and from each other, a clamping device mounted on a carriage, 38, moving at right angles to the direction of the other carriages 2, sustaining the plate 13 in a vertical position, and a gage whereby the same may centralize itself, and a device for removing the gage from beneath the plate 13 after the same has been secured in the clamping-disks.

4. In a machine for shearing circular plates of metal, a gage consisting of two vertical posts, 18, having adjustably attached thereto two guides, 19, a slotted bar, 20, for connecting the posts 18 together, and suitable slides whereby the same may be moved in opposite directions.

5. In a machine for the purpose described, the rotary shear-blades 8, mounted on shafts supported in bearings on suitable sliding carriages, and a means for operating the same, in combination with a carriage, 38, moving in an opposite direction, having a clamping device mounted thereon adapted to sustain a metallic plate in a vertical position, and a means for operating the same.

JOHN T. DUFF.

Witnesses:
M. E. HARRISON,
D. C. NEGLEY.